United States Patent
Uegane et al.

(10) Patent No.: US 6,419,280 B2
(45) Date of Patent: Jul. 16, 2002

(54) EXHAUST PIPE JOINT ASSEMBLY

(75) Inventors: Masayuki Uegane; Hidekazu Akiyama, both of Tochigi-ken; Kazunori Koinuma; Kazutoshi Takizawa, both of Gunma-ken; Takahiko Naitou, Saitama-ken; Hidenori Suzuki, Tochigi-ken, all of (JP)

(73) Assignees: Honda Giken Kogyo Kabushiki Kaisha; Sankei Giken Kogyo Kabushiki kaisha, both of Tokyo (JP)

( * ) Notice: Subject to any disclaimer, the term of this patent is extended or adjusted under 35 U.S.C. 154(b) by 27 days.

(21) Appl. No.: 09/754,336

(22) Filed: Jan. 5, 2001

(30) Foreign Application Priority Data

Jan. 13, 2000 (JP) ........................ 2000-004666

(51) Int. Cl.$^7$ ................................ F16L 27/12
(52) U.S. Cl. ..................... 285/300; 285/49; 285/299
(58) Field of Search ..................... 285/49, 299, 300, 285/301

(56) References Cited

U.S. PATENT DOCUMENTS

| | | | | |
|---|---|---|---|---|
| 1,824,422 A | * | 9/1931 | Badger | 285/300 |
| 2,627,732 A | * | 2/1953 | Gerner | 285/300 |
| 2,821,414 A | * | 1/1958 | Jensen | 285/300 |
| 3,133,754 A | * | 5/1964 | Peters | 285/300 |
| 3,492,030 A | * | 1/1970 | Harrison et al. | 285/300 |
| 4,475,341 A | * | 10/1984 | Inoue et al. | 285/49 |
| 4,697,829 A | * | 10/1987 | Pond | 285/299 |
| 5,145,215 A | * | 9/1992 | Udell | 285/49 |
| 5,340,165 A | * | 8/1994 | Sheppard | 285/299 |
| 5,782,506 A | * | 7/1998 | Uematsu et al. | 285/299 |
| 6,331,019 B1 | * | 12/2001 | Friess et al. | 285/49 |

FOREIGN PATENT DOCUMENTS

| JP | A 60-1347 | 1/1985 |
|---|---|---|
| JP | A 2-58503 | 12/1990 |

* cited by examiner

Primary Examiner—Lynne H. Browne
Assistant Examiner—James M Hewitt
(74) Attorney, Agent, or Firm—Sughrue Mion, PLLC

(57) ABSTRACT

An exhaust pipe assembly provided with a bellows pipe for connecting an upstream exhaust pipe and a downstream exhaust pipe is disposed so as to form a double pipe construction with a first joint pipe which is connected to the upstream exhaust pipe and a second joint pipe which is connected to the downstream exhaust pipe. A pair of ball receiving portions are disposed on a peripheral surface of the first joint pipe at a distance from each other in a circumferential direction, and a pair of ball receiving portions are disposed on a peripheral surface of the second joint pipe at a distance from each other in a circumferential direction. The ball receiving portions are disposed at an angular phase difference with each other in the circumferential direction. There is provided a coupling piece which has a pair of first ball joint portions engaged with the pair of ball receiving portions of the first joint pipe through a ball, and a pair of second ball joint portions engaged with the pair of ball receiving portions of the second joint pipe respectively through a ball.

5 Claims, 4 Drawing Sheets

LATERAL DIRECTION (Y)

VERTICAL DIRECTION (Z)

EXHAUST PIPE JOINT ASSEMBLY

BACKGROUND OF THE INVENTION

1. Field of the Invention

The present invention relates to an exhaust pipe joint assembly (i.e., a joint assembly for connecting exhaust pipes together) which is interposed in an exhaust-gas system mainly of an engine for a motor vehicle such that an exhaust pipe on an upstream side (hereinafter also called "an upstream exhaust pipe") and an exhaust pipe on a downstream side (hereinafter also called "a downstream exhaust pipe") can be connected in a manner to be relatively displaceable by bending.

2. Description of Related Art

An exhaust pipe which is disposed in an exhaust-gas system of an engine for a motor vehicle receives the transmission of vibrations of the engine. The vibrations are in turn transmitted to a motor vehicle body through a supporting member of the exhaust pipe, thereby resulting in the occurrence of noises.

In order to solve this kind of problem, there has hitherto been known an exhaust pipe joint assembly having interposed in an exhaust-gas system of an engine a spherical joint (Japanese Published Examined Patent Application No. 58503/1990) or a joint made up of a bellows pipe (Japanese Published Examined Utility Model Registration Application No. 1347/1985). The vibrations transmitted to the exhaust pipe are thus absorbed by the displacement of the exhaust pipe joint assembly.

In order to efficiently absorb the vibrations transmitted to the exhaust pipe by a bending displacement of the exhaust pipe joint assembly, it is necessary to minimize a minimum torque at which the exhaust pipe joint assembly gives rise to the bending displacement (hereinafter called "a starting torque to generate a bending displacement").

The above-described spherical joint is displaceable by bending in all bending directions. However, since spherical sliding surfaces of a sealing member (gasket) and of a spherical flange are being forcibly urged toward each other, a sliding resistance becomes large. As a result, the starting torque to generate a bending displacement is large. In addition, there were cases in which exhaust gases leaked to some extent through the in sliding surfaces.

On the other hand, the above-described joint made up of the bellows pipe has advantages in that it can be bent in all bending directions, that the starting torque to generate a bending displacement is small, and that there is no leakage of exhaust gases. However, when the engine largely moves due to a torque reaction force, inertia force, or the like, relative to the vehicle body, the amounts of extension and contraction as well as of bending of the bellows pipe becomes excessive if the bellows pipe is small in length. As a result, undue stresses are operated on the bellows pipe. Therefore, in order to secure a sufficient strength and durability of the bellows pipe that will not generate cracks or the like, it is necessary to form the bellows pipe to have a certain length. As a consequence, there is a problem in that the joint made up of the bellows pipe is inferior to the spherical joint in points of cost, weight, and space to be occupied thereby.

The present invention has an object of providing an exhaust pipe joint assembly which is free from the above-described problems while maintaining the above-described advantages of the joint made up of the bellows pipe.

SUMMARY OF THE INVENTION

In order to attain the above and other objects, the present invention is an exhaust pipe joint assembly which is interposed in an exhaust-gas system of an engine and which has a bellows pipe for connecting an upstream exhaust pipe and a downstream exhaust pipe, comprising: a first joint pipe connected to the upstream exhaust pipe and a second joint pipe connected to the downstream exhaust pipe, both the joint pipes being disposed so as to form a double pipe construction with the bellows pipe; a first pair of ball receiving portions disposed on a peripheral surface of the first joint pipe at a distance from each other in a circumferential direction and a second pair of ball receiving portions disposed on a peripheral surface of the second joint pipe at a distance from each other in the circumferential direction, the first pair of ball receiving portions and the second pair of ball receiving portions being disposed at an angular phase difference with each other in the circumferential direction; and a coupling piece having a pair of first ball joint portions engaged with the first pair of ball receiving portions of the first joint pipe respectively through a ball, and a pair of second ball joint portions engaged with the second pair of ball receiving portions of the second joint pipe respectively through a ball.

According to the present invention, the first joint pipe becomes displaceable relative to the coupling piece by rotation about a line connecting the pair of the first ball joint portions. Further, the second joint pipe becomes displaceable relative to the coupling piece by rotation about a line connecting the pair of the second ball joint portions. In addition, the first ball joint portions and the second ball joint portions have the same angular phase difference as that between the ball receiving portions of the first joint pipe and the ball receiving portions of the second joint pipe. As a result, the second joint pipe becomes displaceable relative to the first joint pipe by bending with a small starting torque in all directions. The advantages peculiar to the bellows pipe are thus not impaired. On the other hand, by means of each of the ball joint portions, the displacement in the longitudinal direction of each of the joint pipes relative to the coupling piece is restricted. Further, by the interference of the coupling piece with each of the joint pipes, the bending displacement of both the joint pipes is restricted to a predetermined range. Therefore, even if the engine largely moves relative to the vehicle body due to the torque reaction force, the inertia force, or the like, the amounts of extension and contraction as well as of bending are restricted to a predetermined range. As a result, undue stresses are not operated on the bellows pipe. Even if the bellows pipe is made smaller in length, there will occur no problem in strength and durability. The above-described problems relating to the bellows pipe will thus be solved.

Although the above-described exhaust pipe assembly according to the present invention is capable of being bent in all directions, the angular phase difference is preferably made to be 90°. The changes in the starting torque depending on the changes in the bending direction can advantageously be made smaller.

It is also possible to dispose the first ball joint portions and the second ball joint portions in the same position in the longitudinal direction of the joint pipes. In such as arrangement, however, it is necessary to form a large notch in the periphery of each of the joint pipes in a portion corresponding to the ball receiving portions of the other of the joint pipes in order to avoid interference of the two joint pipes. As a result, the rigidity of the joint pipes becomes lower and there is a possibility that the joint pipes and the coupling piece become rickety. As a solution, preferably, the first ball joint portions and the second ball joint portions are disposed at a distance from each other in the longitudinal direction of the joint pipes. Then, there is no need of forming the notch in the periphery of the joint pipe. Even if there is such a need, the notch may be kept small to the extent possible. Therefore, the rigidity of the joint pipes can be secured and the disadvantage in that the joint pipes and the coupling piece become rickety can be prevented.

Still furthermore, although it is possible to dispose both the joint pipes and the coupling piece outside the bellows pipe, preferably both the joint pipes and the coupling piece are disposed inside the bellows pipe in order to protect the ball joint portions from foreign substances such as dirts, water, or the like.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
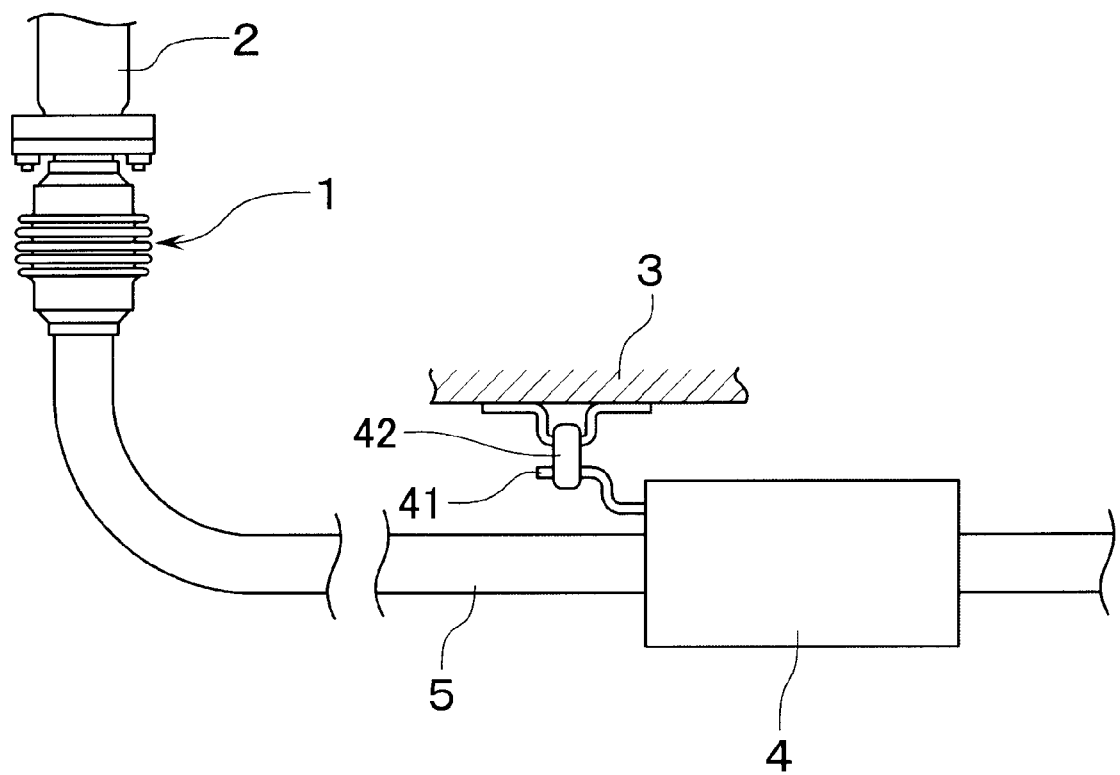
FIG. 1 a schematic side view of an engine exhaust-gas system in which an exhaust pipe joint assembly according to the present invention is interposed.

As shown in FIG. 1, an exhaust pipe joint assembly 1 according to the present invention is interposed in an exhaust-gas system of an engine for a motor vehicle in a manner to connect an exhaust manifold 2, which is an upstream exhaust pipe, and a downstream exhaust pipe 5 which is communicated with a silencer 4 disposed under a floor 3 of a vehicle body. The silencer 4 is supported under the floor 3 by means of a mounting rubber 42 through which is passed a stay 41 which is in the shape of a bar and is fixed to the silencer 4.

Figure 2:
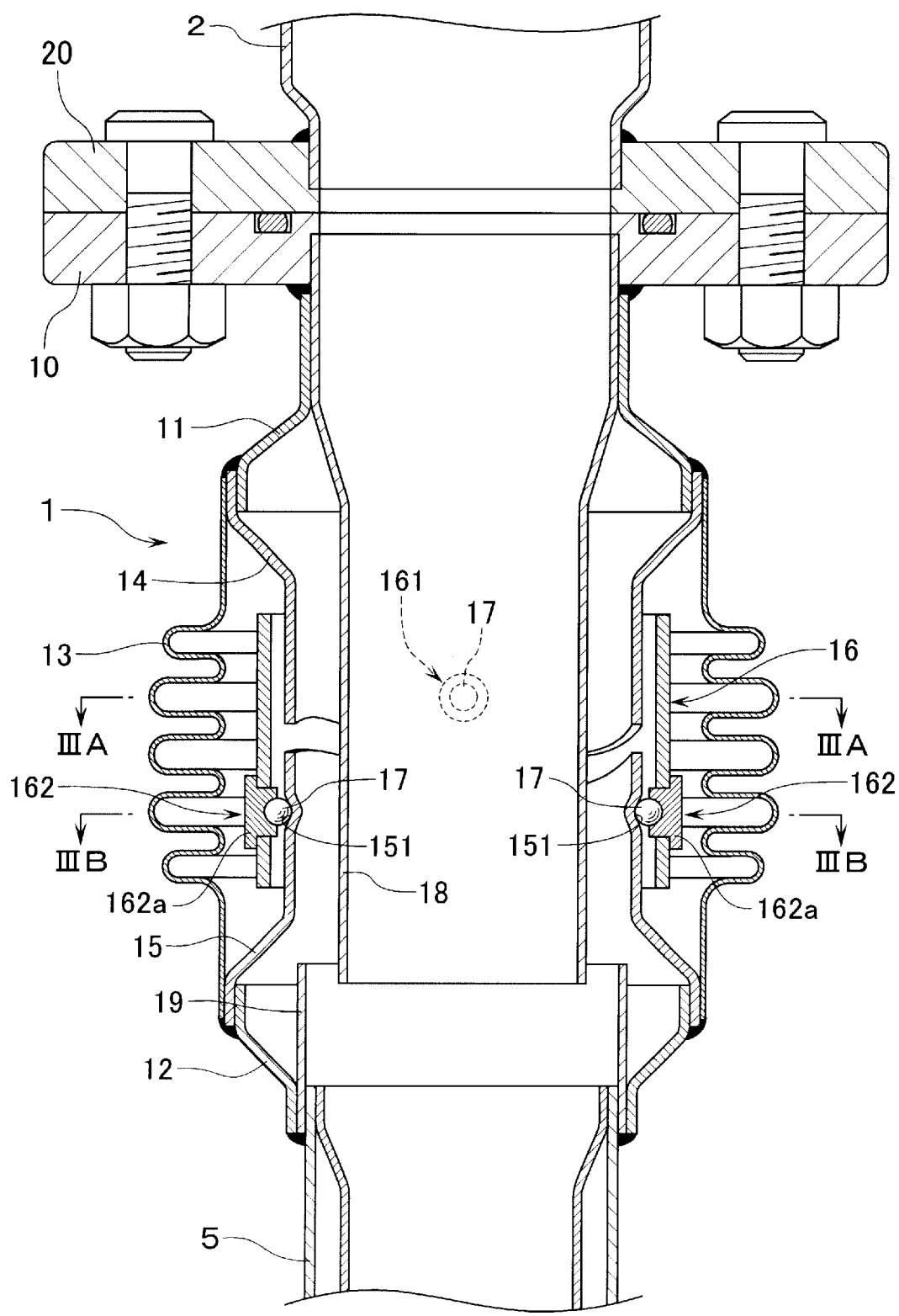
FIG. 2 is an enlarged sectional view of the exhaust pipe joint of FIG. 1.

With reference to FIG. 2, the exhaust pipe joint assembly 1 is provided with a flange 10 which is mated with a flange 20 on a downstream end of the exhaust manifold 2. The exhaust pipe joint assembly 1 is further provided with a bellows pipe 13. One end of the bellows pipe 13 is welded to an upstream connecting pipe 11 which is connected to the flange 10, and the other end of the bellows pipe 13 is welded to a downstream connecting pipe 12 which is welded to an upstream end of the downstream exhaust pipe 5. Further, the exhaust pipe joint assembly 1 is further provided, on an inside of the bellows pipe 13, with a first joint pipe 14 whose one end is welded to the upstream connecting pipe 11, and a second joint pipe 15 whose one end is welded to the downstream connecting pipe 12. These first and second joint pipes 14, 15 are disposed such that they form a double-pipe construction with the bellows pipe 13. There is also provided a coupling piece 16 which is loosely fitted onto both the first and second joint pipes 14, 15.

Figure 3A:
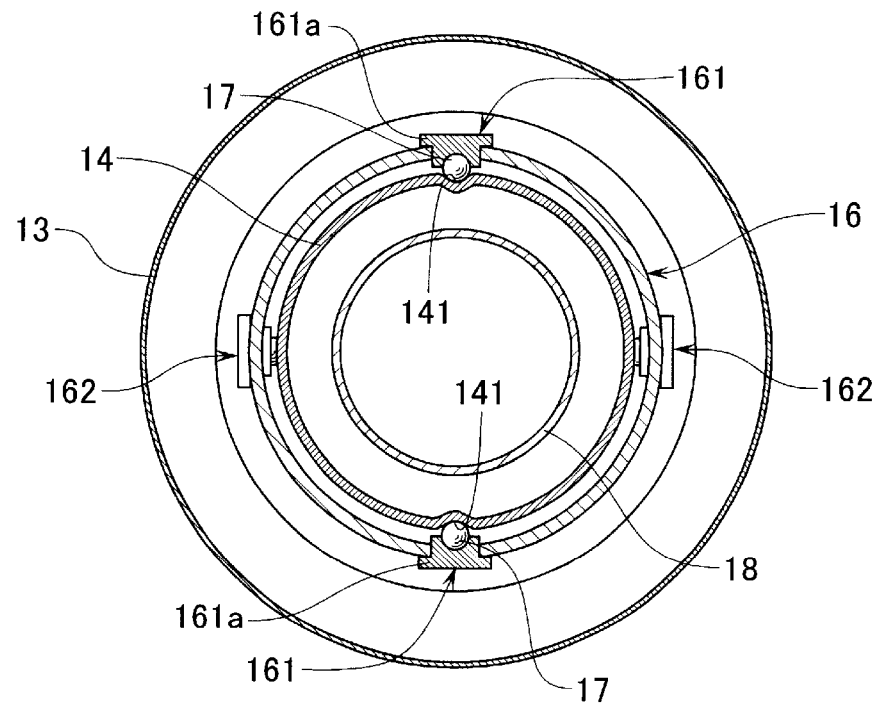
FIG. 3A is a sectional view taken along the line IIIA—IIIA in FIG. 2
Figure 3B:
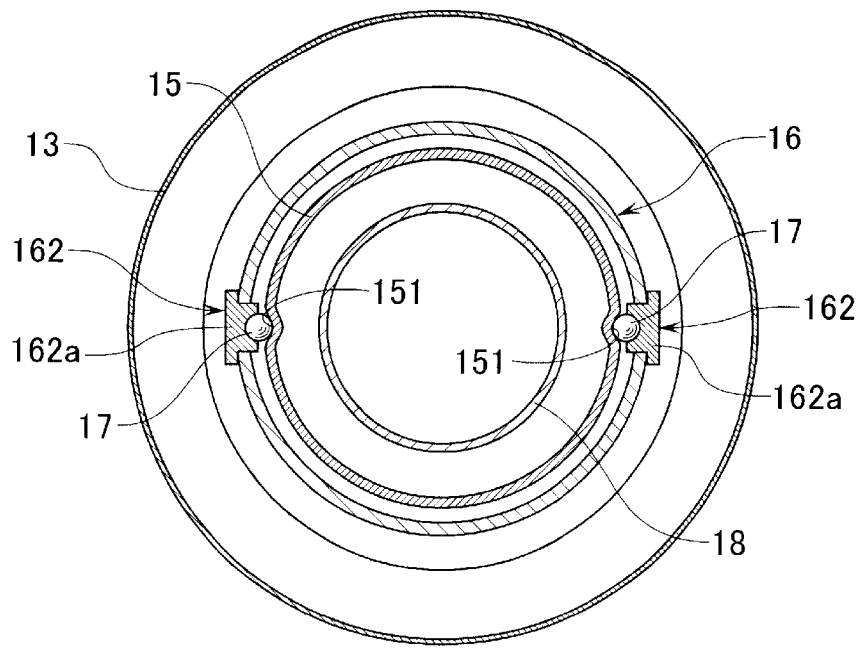
FIG. 3B is a sectional view taken along the line IIIB—IIIB in FIG. 2.

As shown in FIG. 3A, on a peripheral surface of the first joint pipe 14, there are formed a pair of ball receiving portions 141, 141 at a distance of 180° in the circumferential direction. Each of the ball receiving portions 141, 141 is made up of a hemispherical recession. As shown in FIG. 3B, on a peripheral surface of the second joint pipe 15, there are formed a pair of ball receiving portions 151, 151 at a distance of 180° in the circumferential direction. Each of the ball receiving potions 151, 151 is made up of a hemispherical recession at an angular phase difference of 90° relative to the ball receiving portions 141, 141 of the first joint pipe 14.

The coupling piece 16 is formed into a tubular shape having a length sufficient to cover each of the ball receiving portions 141, 151 of both the first and second joint pipes 14, 15. In that portion of the coupling piece 16 which is loosely fitted onto the first joint pipe 14, there are provided a pair of ball holding members 161a, 161a. Each of the ball holding members 161a, 161a has a hemispherical recess in a position which corresponds to the pair of ball receiving portions 141, 141 of the first joint pipe 14. A pair of first ball joint portions 161, 161, which are engaged with the ball receiving portions 141, 141 respectively through a ball 17, are constituted by means of both the ball holding members 161a, 161a. In that portion of the coupling piece 16 which is loosely fitted onto the second joint pipe 15, there are provided a pair of ball holding members 162a, 162a. Each of the ball holding members 162a, 162a has a hemispherical recess in a position which corresponds to the pair of ball receiving portions 151, 151 of the second joint pipe 15. A pair of second ball joint portions 162, 162, which are engaged with the ball receiving portions 151, 151 respectively through a ball 17, are constituted by means of both the ball holding members 162a, 162a. Between the first ball joint portions 161, 161 and the second ball joint portions 162, 162, there is provided an angular phase difference of 90° that is identical to the angular phase difference between the ball receiving portions 141, 141 of the first joint pipe 14 and the second ball receiving portions 151, 151 of the second joint pipe 15. The first ball joint portions 161, 161 and the second ball joint portions 162, 162 are disposed at a distance from each other in the longitudinal direction of both the joint pipes 14, 15. The first and second joint pipes 14, 15 are thus arranged to lie opposite to each other at a distance from each other in the longitudinal direction.

On the inside of the upstream connecting pipe 11, there is disposed an upstream exhaust guide pipe 18 which passes through the inside of both the joint pipes 14, 15 so as to extend down to the neighborhood of the downstream connecting pipe 12. Each of the ball joint portions 161, 162 is thus prevented from being exposed to the exhaust gas. This upstream exhaust guide pipe 18 is welded, at its upstream end, to the flange 10 together with the upstream connecting pipe 11. On the inside of the downstream connecting pipe 12, there is disposed a downstream exhaust guide pipe 19 in a manner to enclose the downstream end of the upstream exhaust guide pipe 18. This downstream exhaust guide pipe 19 is welded to the downstream exhaust pipe 5 together with the downstream connecting pipe 12.

According to the above-described arrangement, the coupling piece 16 becomes displaceable, relative to the first joint pipe 14, by rotation about a line connecting the pair of the first ball joint portions 161, 161. Further, the second joint pipe 15 becomes displaceable, relative to the coupling piece 16, by rotation about a line connecting the pair of the second ball joint portions 162, 162. Since the first ball joint portions 161, 161 and the second ball joint portions 162, 162 have an angular phase difference, the second joint pipe 15 becomes capable of being displaceable relative to the first joint pipe 14 by bending in all directions with a small starting torque.

Therefore, the advantages peculiar to the bellows pipe 13 are not impaired. Particularly, in this embodiment, since the angular phase difference between the pair of the first ball joint portions 161, 161 and the pair of the second ball joint portions 162, 162 is made to be 90°, the changes of the starting torque with the change in the bending direction advantageously become small. On the other hand, the displacement of the joint pipes 14, 15 in the longitudinal direction relative to the coupling piece 16 is restricted by the respective ball joint portions 161, 162. Also, the rotational displacement of both the joint pipes 14, 15 is limited to a predetermined range by the interference of the coupling piece 16 with both the joint pipes 14, 15. Therefore, even if the engine largely moves due to a torque reaction force, an inertia force, or the like, the amounts of extension and contraction, as well as of bending of the bellows pipe 13 are limited to a predetermined range. In this manner, even if the bellows pipe 13 becomes small in length, undue stresses will not be operated on the bellows pipe 13.

It is possible to dispose the first and the second ball joint portions 161, 162 in the same position in the longitudinal direction of both the joint pipes 14, 15. In this arrangement, however, it becomes necessary to form larger notches in the periphery of each of the joint pipes 14, 15 to correspond to the ball receiving portions of the other of the joint pipes 14, 15, thereby avoiding the interference of both the joint pipes. In the present embodiment, on the other hand, the first ball joint portions 161 and the second ball joint portions 162 are separated from each other in the longitudinal direction of both the joint pipes 14, 15. Therefore, there is no need of forming notches in the periphery of the joint pipes 14, 15. As a result, the rigidity of the joint pipes 14, 15 can be secured, and there will occur no disadvantage in that the joint pipes 14, 15 and the coupling piece 16 become rickety.

Further, it is also possible to dispose both the joint pipes 14, 15 and the coupling piece 16 outside the bellows pipe 13. In the present embodiment, on the other hand, both the joint pipes 14, 15 and the coupling piece 16 are disposed inside the bellows pipe 13. Therefore, the ball joint portions 161, 162 are protected from the foreign substances such as dirts, water, or the like.

Figure 4A:
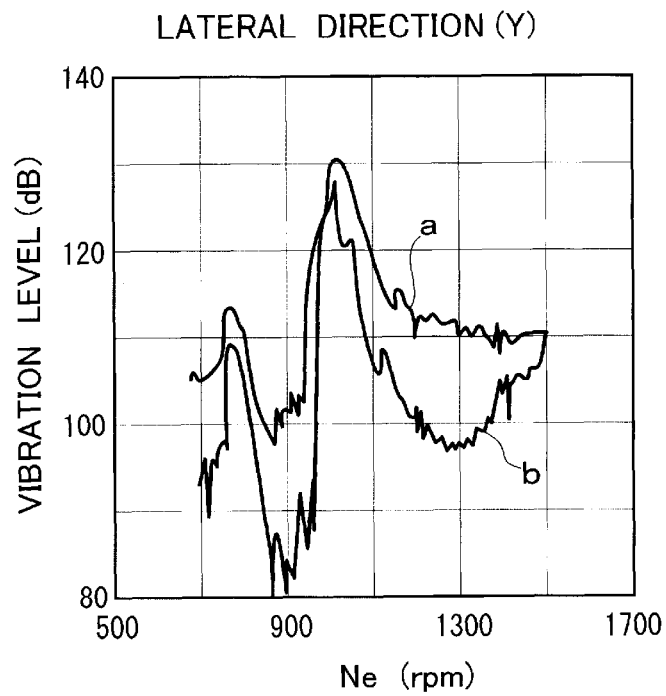
FIG. 4A is a graph showing the vibration level in the lateral direction of the exhaust pipe and FIG. 4B is a graph showing the vibration level in the vertical direction of the exhaust pipe.
Figure 4B:
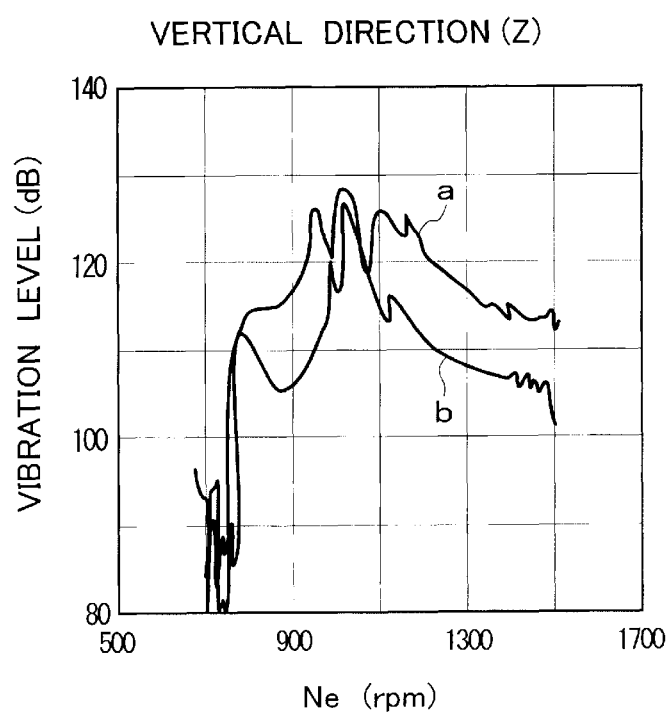

FIGS. 4A and 4B are graphs to compare the vibration levels at the stay 41 of the silencer 4 between two cases, i.e., between one case in which the conventional spherical joint having a large starting torque was used as the joint to connect the exhaust manifold and the exhaust pipe, and the other case in which the exhaust pipe joint according to the above-described embodiment was used as the joint to connect the exhaust manifold and the exhaust pipe. FIG. 4A shows the vibration levels in the lateral (right and left) direction of the vehicle body, and FIG. 4B shows the vibration levels in the vertical (up and down) direction of the vehicle body. In each of the figures, the abscissa represents the rotational speed Ne of the engine. Line "a" in FIGS. 4A and 4B shows the measured data when the spherical joint was used, and line b shows the measured data when the exhaust pipe joint according to the above-described embodiment was used. According to the result of these measurements, a large effect of reducing the vibration levels in the lateral direction and in the vertical direction, which contribute much to the transmission of the vibrations to the vehicle body, has been recognized.

An explanation has so far been made about the embodiment in which the present invention was applied to the exhaust pipe joint assembly which is interposed between the exhaust manifold 2 and the exhaust pipe 5 communicated with the silencer 4. The present invention can also be applied to an embodiment in which the exhaust pipe joint 1 is interposed in an intermediate portion of the exhaust pipe 5.

As can be seen from the above-described explanations, according to the present invention, even if the engine largely moves due to the torque reaction force, the inertia force, or the like, the amounts of extension and contraction, as well as of bending, of the bellows pipe can be limited to a predetermined range. Therefore even if the bellows pipe is made small in length, undue stresses are not operated on the bellows pipe. There will thus occur no problem in the strength and durability of the bellows pipe. As a consequence, the bellows pipe can be made smaller in length, with the result that the cost, weight and space of the exhaust pipe joint can be reduced.

It is readily apparent that the above-described exhaust pipe joint assembly meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An exhaust pipe joint assembly which is interposed in an exhaust-gas system of an engine and which has a bellows pipe for connecting an upstream exhaust pipe and a downstream exhaust pipe, comprising:

a first joint pipe connected to said upstream exhaust pipe and a second joint pipe connected to said downstream exhaust pipe, both said joint pipes being disposed so as to form a double pipe construction with said bellows pipe;

a first pair of ball receiving portions disposed on a peripheral surface of said first joint pipe at a distance from each other in a circumferential direction and a second pair of ball receiving portions disposed on a peripheral surface of said second joint pipe at a distance from each other in the circumferential direction, said first pair of ball receiving portions and said second pair of ball receiving portions being disposed at an angular phase difference with each other in the circumferential direction; and a coupling piece having: a pair of first ball joint portions engaged with said first pair of ball receiving portions of said first joint pipe respectively through a ball; and a pair of second ball joint portions engaged with said second pair of ball receiving portions of said second joint pipe respectively through a ball.

2. The exhaust pipe joint assembly according to claim 1, wherein said angular phase difference is 90°.

3. The exhaust pipe joint assembly according to claim 1, wherein said first ball joint portions and said second ball joint portions are disposed at a distance from each other in a longitudinal direction of said joint pipes.

4. The exhaust pipe joint assembly according to claim 2, wherein said first ball joint portions and said second ball joint portions are disposed at a distance from each other in a longitudinal direction of said joint pipes.

5. The exhaust pipe joint assembly according to claim 1, wherein both said joint pipes and said coupling piece are disposed inside said bellows pipe.

* * * * *